Sept. 29, 1925. 1,554,988
J. G. CARROLL
BRAKE SUPPORT BRACKET
Filed July 27, 1923 2 Sheets-Sheet 1
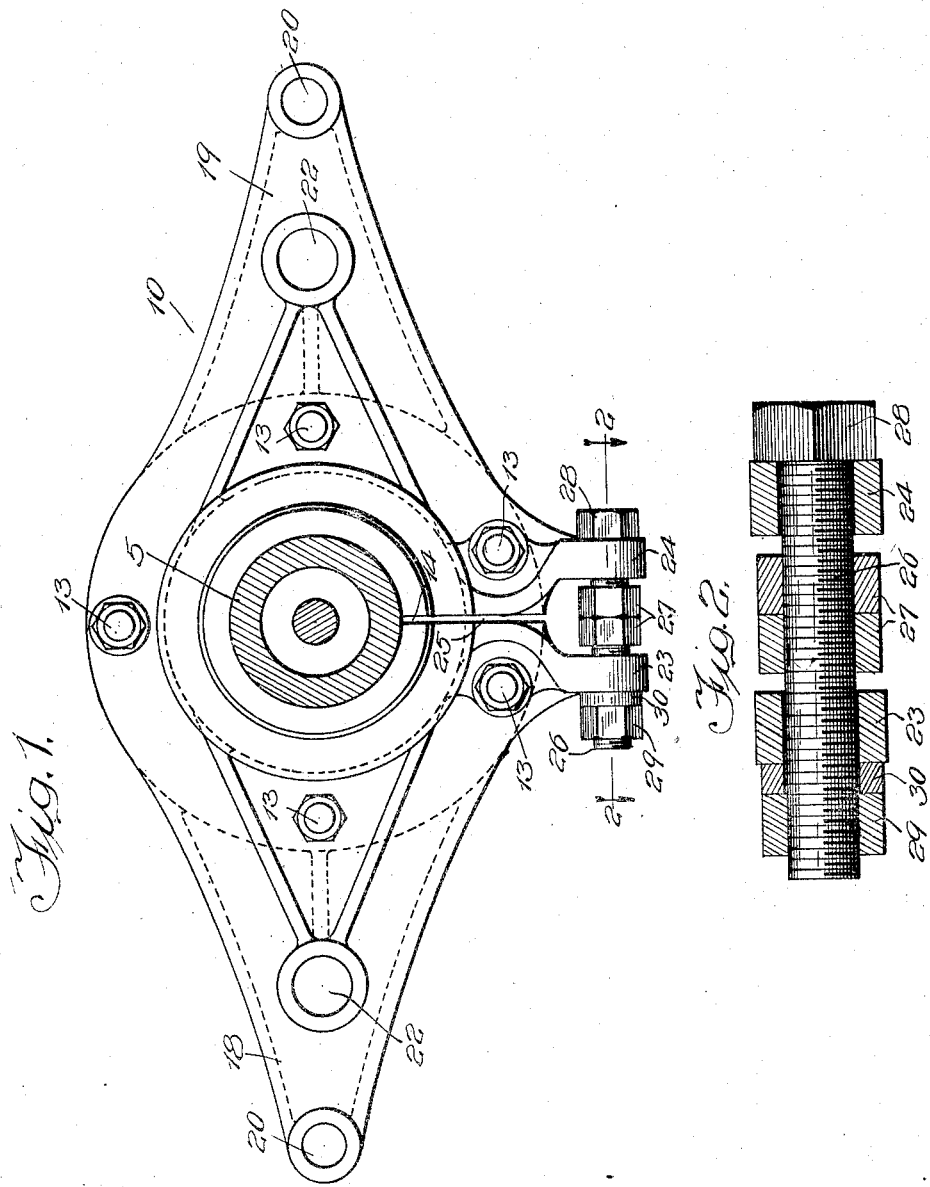

Sept. 29, 1925.
J. G. CARROLL
1,554,988
BRAKE SUPPORT BRACKET
Filed July 27, 1923     2 Sheets-Sheet 2
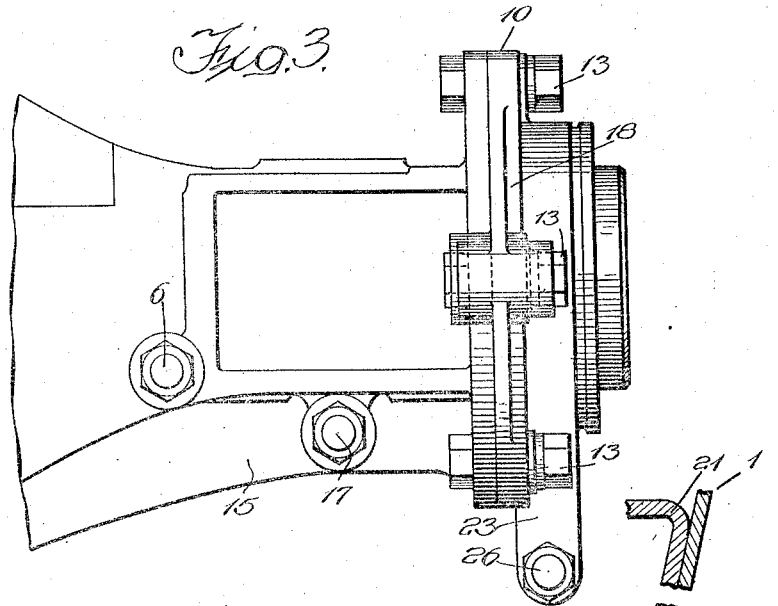
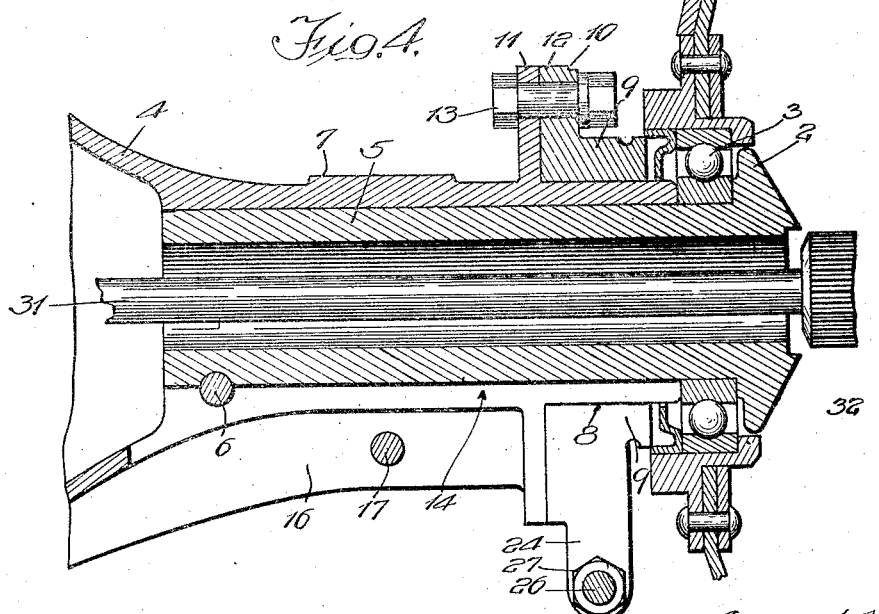
Witnesses:
W. P. Kilroy
Harry R. L. White
Inventor:
John G. Carroll Patented Sept. 29, 1925.

1,554,988

UNITED STATES PATENT OFFICE.

JOHN G. CARROLL, OF CHICAGO, ILLINOIS, ASSIGNOR TO WALKER VEHICLE COMPANY, OF CHICAGO, ILLINOIS, A CORPORATION.

BRAKE-SUPPORT BRACKET.

Application filed July 27, 1923. Serial No. 654,094.

*To all whom it may concern:*

Be it known that I, JOHN G. CARROLL, a citizen of the United States, residing at Chicago, in the county of Cook and State of Illinois, have invented a certain new and useful Improvement in Brake-Support Brackets, of which the following is a full, clear, concise, and exact description, reference being had to the accompanying drawings, forming a part of this specification.

My invention relates to vehicle construction, and more particularly to an improvement in the rear axle housing and brake support bracket structure. While I shall describe my invention in connection with a rear axle and wheel construction known as the "Walker drive", it is to be understood that the invention is not limited to use in connection with this particular drive, but may be employed for other rear axle and drive construction.

According to my invention, I provide a bracket which is mounted upon the end of the axle housing, which bracket provides support for the brake mechanism on the rear wheel or wheels, and serves also as a split clamp for clamping the end of the axle housing which is slotted upon the stub axle of the corresponding wheel to hold it firmly to the axle housing. This split clamp is provided also with means for spreading the split clamp and for contracting the same.

In order to acquaint those skilled in the art with the manner of constructing and operating my invention, I shall now describe the same in connection with the accompanying drawings in which Fig. 1 is a face view of the bracket of my invention as applied on the end of the axle housing, which is shown partly in end elevation;

Fig. 2 is a fragmentary sectional view taken on the line 2—2 of Fig. 1;

Fig. 3 is a side elevational view of the bracket and the adjacent end of the axle housing viewed from the left side of Fig. 1; and Fig. 4 is a longitudinal section through the end of the axle housing and through the bracket, showing a part of the wheel.

The Walker drive, as is well understood by those skilled in the art and more fully disclosed in Patent No. 1,420,793, to George R. Walker, June 27, 1922, comprises a dead axle housing with a live spindle or shaft for each rear wheel with a gear reduction in the wheel. The wheel itself, which I have indicated as an entirety by the reference numeral 1 in Fig. 4, is mounted upon a stub axle and yoke member 2 through suitable bearings, the inner one of which is shown at 3 adjacent the end of the axle housing 4. The axle housing 4 has a hollow cylindrical bore which receives the cylindrical stub axle portion 5, which portion 5 is integral with the yoke member for supporting idling gears, not shown, as is well understood in the Walker drive. This stub axle is keyed in place in the present instance by a bolt 6 which lies in a groove formed in the lower part of the cylindrical stub axle portion 5. The end of the housing 4 adjacent the wheel 1, which forms the cylindrical socket, has upon its upper surface a spring pad 7 for mounting the vehicle spring between the axle and the rear end of the body or frame. The extreme outer end of the axle housing 4 is machined to provide a cylindrical outer surface 8 to receive the split clamp or hub portion 9 of the bracket 10. A flange 11 is formed integral with the outer end of the axle housing 4 and its right hand face, as seen in Fig. 4, is machined to fit closely against the corresponding flange 12 of the brake support bracket 10. These flanges are clamped together by bolts 13 which in this case are shown as five in number (see Fig. 1), the outer end of the axle housing which forms the socket for the stub portion 5 is slotted or slit, as indicated at 14 in Fig. 1, and flanges 15 and 16 are formed integral with the circular flange 11 and the adjacent edges of the housing 4. These longitudinal flanges are adapted to be drawn together by means of the bolt 17, for shrinking or clamping this part of the axle housing upon the cylindrical stub portion 5. The brake support bracket 10 has laterally extending arms 18 and 19, which are preferably identical, so that the same bracket may be used upon the left side or right side of the vehicle. Each arm has an outer bearing support 20 for supporting a shaft or pin for the outer or contracting brake band, which goes upon the outside surface of the brake drum 21, shown in a fragmentary way in Fig. 4. Each arm also contains a suitable bearing 22 for supporting a shaft or pin employed in connection with an internal or expanding brake for use upon the inner cylindrical surface of the brake drum 21. The particular form of brake band or operating mechanism is not important, and it may be varied. Neither is it necessary for my invention that the bearings 20 be of the same size for the arms 18 and 19, nor that the bearings 22 be of the same size for the arms 18 and 19.

Lugs or ears 23 and 24 are formed integral with the lower clamping or cylindrical hub portion 9 of the brake support bracket, and the brake support bracket is slotted as is clearly indicated in Fig. 1 by reference numeral 25; this slot registering with the slot 14 in the axle housing so that when the brake support bracket is clamped by means of the bolts 13 to the flange 11, this brake support bracket becomes substantially an integral part of the outer end of the axle housing. These depending lugs or ears 23 and 24 are drilled to receive loosely the bolt or stud 26. Sufficient room is provided between the lugs or ears 23, 24, to provide for the threaded nuts 27. The head of the bolt 26 rests against the outside of the lug 24 and a nut 29 with an interposed spring washer 30 lies against the outer surface of the lug 23 for drawing the ears 23, 24 together when the bracket and end of the axle housing operates as a split clamp to grip the end of the stub axle and yoke member. When it is desired to open the split clamp to release the stub axle member, the nut 29 is backed off and the nuts 27 are threaded out against the adjacent inner surfaces of the ears 23 and 24, the central part of the bolt 26 then operating as a strut to push the ears or lugs 23, 24 apart and to thus spread the split clamp to facilitate withdrawal or introduction of the stub axle upon which the wheel is mounted.

It is believed that the operation of the device will be clear from the above description.

I have shown the live axle at 31 leading to the driving pinion 32 for indicating the Walker type of drive.

In case of wear or breakage, the brake supporting bracket may readily be taken off and repaired or replaced. The brake will always remain in alignment with the brake drum and will not be affected by shifting of the spring on the rear axle or shifting of the frame with respect to the rear axle, since this bracket is accurately centered by the end of the axle housing and firmly united therewith.

I do not intend to be limited to the details shown or described.

I claim:—

1. In combination, an axle housing having a substantially cylindrical bore, a stub axle in said bore, said housing being slotted or split lengthwise along one side of said bore, lugs secured to said housing, one on each side of said slot, a stud extending through said lugs, means on said stud between said lugs for spreading said slot, and means on the stud external to the lugs for contracting the slot.

2. In combination, an axle housing having a bore, a stub axle in said bore, said housing being slotted or split lengthwise along one side of said bore, a brake supporting bracket member having a central split clamp member engaging the end of said housing, lugs secured to said member, means connecting said member to the axle housing, and common means for spreading or shrinking the split clamp member.

3. In combination, an axle housing having a cylindrical socket for receiving a stub axle, said socket being slotted along one side, flanges extending from said housing on each side of the slot, clamping means for clamping said flanges together to shrink said socket, a split clamp surrounding the end of the socket, means for securing said split clamp to the outside of said socket, and common means for spreading or shrinking said split clamp member.

4. In combination, an axle housing having a cylindrical socket for receiving a stub axle, said socket being slotted along one side, flanges extending from said housing on each side of the slot, clamping means for clamping said flanges together to shrink said socket, a split clamp surrounding the end of the socket, means for securing said split clamp to the outside of said socket, and common means for spreading or shrinking said split clamp member, and arms extending from said split clamp member, said arms being adapted to support brake mechanism.

5. In combination, an axle housing having a flange, a cylindrical end beyond the flange, said housing being slotted longitudinally through the cylindrical part and through the flange, a brake supporting bracket member having a flange bolted to said first flange, said member being slotted, and means on said member for spreading or collapsing said slot in common.

6. A brake support bracket having laterally extending arms for supporting brake controlling means, a circular embracing portion, said portion being slotted, ears depending from the sides of the slot, means extending through the ears for shrinking or spreading the slot.

7. A brake supporting bracket comprising a circular body portion having laterally extending arms, said body portion being slotted, and means integral with the body portion for spreading or shrinking the same.

8. In combination, an axle housing having a substantially cylindrical end, a flange adjacent said cylindrical end, an internal socket adapted to receive a stub axle, a brake supporting bracket comprising a clamp having laterally extending arms, means for clamping said split clamp to said axle housing adjacent the cylindrical portion, and means for contracting said split clamp.

9. In combination, an axle housing having a cylindrical end, a peripheral flange adjacent said cylindrical end, a brake supporting member comprising a central split clamp member, a flange and laterally extending arms, means for clamping said latter flange to the first-named flange, means for contracting said split clamp portion.

10. In combination, a hollow axle housing having a cylindrical socket at its outer end, a peripheral flange adjacent the outer end, a brake supporting member comprising a central hub portion embracing the end of the axle housing, a flange portion clamped to said first-named flange, and laterally extending arms adapted to support brake mechanism.

11. In combination, a hollow axle housing having a cylindrical socket adapted to receive a stub axle, an outer cylindrical portion, a peripheral flange adjacent said last-named portion, a brake supporting member comprising a central hub member embracing said cylindrical portion of the axle housing, a flange adapted to be clamped to said first-named flange, and laterally extending arms, said arms having bearings for brake operating means.

In witness whereof, I hereunto subscribe my name this 25th day of July, 1923.

JOHN G. CARROLL.